United States Patent [19]

Loser et al.

[11] Patent Number: 4,768,889

[45] Date of Patent: Sep. 6, 1988

[54] SEALED BEARING ASSEMBLIES

[75] Inventors: Norbert Loser, Puttlingen; Peter Schmehr, Bublingen; Leopold Tilgner, Puttlingen, all of Fed. Rep. of Germany

[73] Assignee: SKF GmbH, Schweinfurt, Fed. Rep. of Germany

[21] Appl. No.: 944,424

[22] Filed: Dec. 19, 1986

[30] Foreign Application Priority Data

Dec. 21, 1985 [DE] Fed. Rep. of Germany ....... 8536143

[51] Int. Cl.⁴ .......................................... F16C 33/74
[52] U.S. Cl. .................................. 384/145; 384/152
[58] Field of Search .............. 384/145, 146, 206, 207, 384/213, 214, 152

[56] References Cited

U.S. PATENT DOCUMENTS

| 3,588,201 | 6/1971 | Schmidt | 384/146 |
| 3,848,938 | 11/1974 | Stella et al. | 384/146 |
| 4,447,094 | 5/1984 | Trudeau et al. | 384/145 |

Primary Examiner—Lenard A. Footland
Attorney, Agent, or Firm—Eugene E. Renz, Jr.

[57] ABSTRACT

A seal assembly for sealing between a pair of bearing rings wherein one of the rings has an annular groove for the seal comprising elastic annular ring member having at least one circumferential projection and at least one sealing disk and a retainer member. The volume of the elastic ring, which has been increased by the retaining sections for the parts to be held in place being in the preinstalled state at least the same as that of annular groove in one of the bearing rings.

7 Claims, 2 Drawing Sheets

SEALED BEARING ASSEMBLIES

FIELD OF THE INVENTION

The present invention relates to sealed bearing assemblies and has particular application to ball and socket joints having an outer ring comprised of two half-shells, the seal consisting of an elastic ring which serves to hold in place one or more sealing disks installed in the bore on the lateral surface of one of the bearing rings.

BACKGROUND OF THE INVENTION

Seals of the general type described above are not new per se. For example, West German Registered Design Pat. No. 1,944,576 shows a seal of this general type. These seals, however, have certain disadvantages and drawbacks. For example, these prior known seals are not suitable for severe dynamic loading by reason of the fact that the disk which is mounted in an annular groove of the elastic ring tends to become loose and when this happens, the bearing can be destroyed.

SUMMARY OF THE INVENTION

With the foregoing in mind, it is an object of the present invention to provide a seal for bearing assembly which is securely and reliably anchored in an annular groove in one of the bearing rings. To this end, and in accordance with the present invention, the seal includes an elastic ring which supports one or more sealing disks or the like in place having at least one projection molded into its circumference and wherein the volume of the elastic ring which has been increased by the retaining sections for the parts to be fastened in place is in the pre-installed state the same as or greater than that of the annular groove in the bore of the ring in which it is mounted. By this arrangement, when the bearing is assembled, the elastic ring with the molded-on projections is compressed so that the parts to be fastened are firmly anchored in the annular groove of the bearing ring.

In accordance with another feature of the present invention, the seal comprises a series of elements configured in a manner to provide a more effective seal without causing significant increased bearing friction. To this end, a socalled angle ring member and wiper ring member are mounted by means of the elastic ring member in the annular groove of the bearing ring. The angle ring member is provided with an angled section located a predetermined distance from the lateral surface of the inner ring having on one side thereof confronting the inner ring, a layer of flocked fibers which bear against the spherical, lateral surface of the inner ring. By this seal configuration, that is in series, the bearing is effectively sealed without causing any significant increase in bearing friction.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENTS

Figure 1:
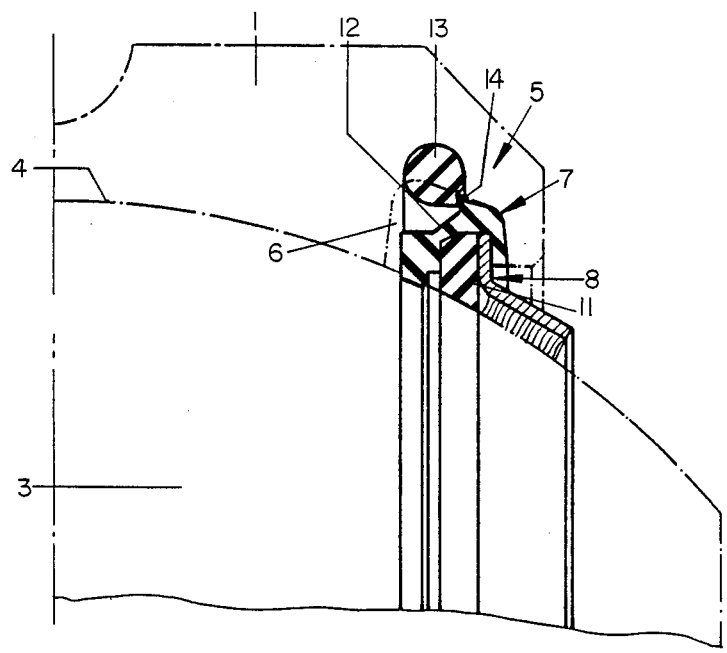
FIG. 1 is a view showing a cross-section of a seal in accordance with the present invention for a ball and socket joint in the pre-installed state.
Figure 2:
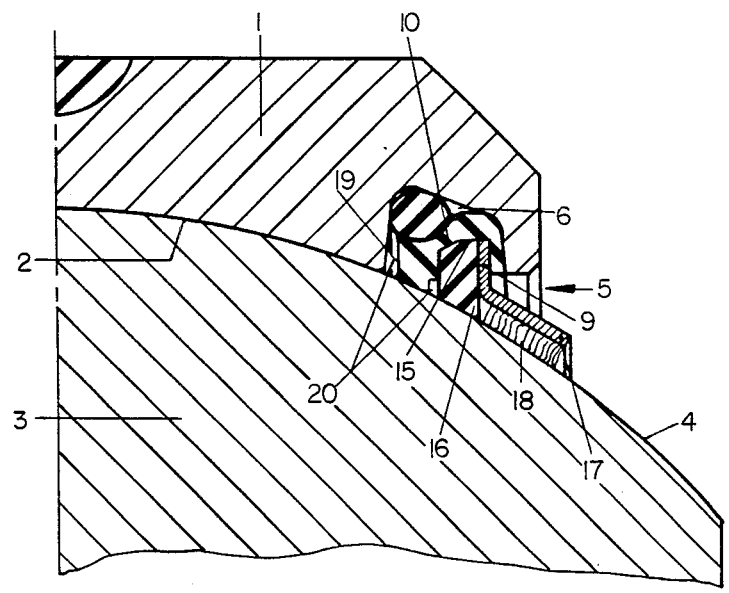
FIG. 2 is a transverse, sectional view similar to FIG. 1 showing a portion of a ball and socket joint with a seal in accordance with the present invention fully installed.

Referring now to the drawings and particularly to FIGS. 1 and 2 thereof, there is illustrated a ball and socket joint and a seal constructed in accordance with the present invention. The ball and socket joint includes an outer ring (shown in broken lines) assembled from two half shells and an inner ring 3 mounted in the bore 2 of the outer ring, the inner ring having, as illustrated and as shown in broken lines, a spherical lateral surface 4. A seal generally designated by the numeral 5 is also shown in FIG. 1 in the the pre-installed state which consists of an annular ring member 7 made of an elastic material which fits in an annular groove 6 in the outer ring, an angle ring 8 having a radially outwardly directed retaining section 9 and a wiper ring 11 made of a relatively hard plastic material having a beveled edge 10 disposed between the retainer and a pocket formed in the body portion 7 of the seal. The body portion 7 further has a retaining ring 12 and an annular bead 13 of O-shaped cross section connected thereto by a web 14 of reduced cross section. As illustrated, angle ring 8 and wiper ring 11 fit in an annular groove 15 of the retaining ring 12. Further, as depicted in the drawings, wiper ring 11 rests and engages on the lateral surface 4 of the inner ring 3.

The inner peripheral surface of the wiper ring 11 has an angled edge as at 16 which during operation of the ball and socket joint wipes foreign particulate matter from the lateral surface 4 of the inner ring. Angle ring 8, as illustrated in FIG. 1, has an angularly disposd projection 17 which is spaced generally uniformly from the lateral surface 4 of the inner ring. A layer of electrostatically deposited flocked fibers is provided on the side of angled section 17 confronting the inner ring so that the free ends of the fibers brush against the spherical lateral surface 4 of the inner ring and provide an enhanced sealing effect. Elastic retaining ring 12 also includes an inwardly projecting, circumferential sealing lip 19 which engages with pretension against lateral surface 4 of the inner ring providing the primary sealing area. The volume of elastic ring 7 which has been increased by the annular groove 15 in the pre-installed state is the same as or greater than that of annular groove 6. Accordingly, when the bearing is assembled, seal 5 fits into annular groove 6 of the outer ring 1 and annular bead 13, which initially has an O-shaped cross section is pressed radially inwardly so that the retaining ring 12 and bead 13 are compressed to assume the positions shown in FIG. 2. In this manner, the wiper ring 11, angle ring 8, and elastic ring 7 are firmly anchored in annular groove 6 and sealing lip 19 is pressed firmly against lateral surface 4 of the inner ring to provide the desired sealing effect. Furthermore, in this manner, there is a residual restoring force in bead 13 which presses radially outwardly against the circumferential surface of annular groove 6 to thereby seal the outer ring even in the area of the separating line between the half shells forming the outer ring. It is also advantageous to fill the space 20 with a lubricant such as grease which reinforces the sealing effect of the seal 5.

Figure 3:
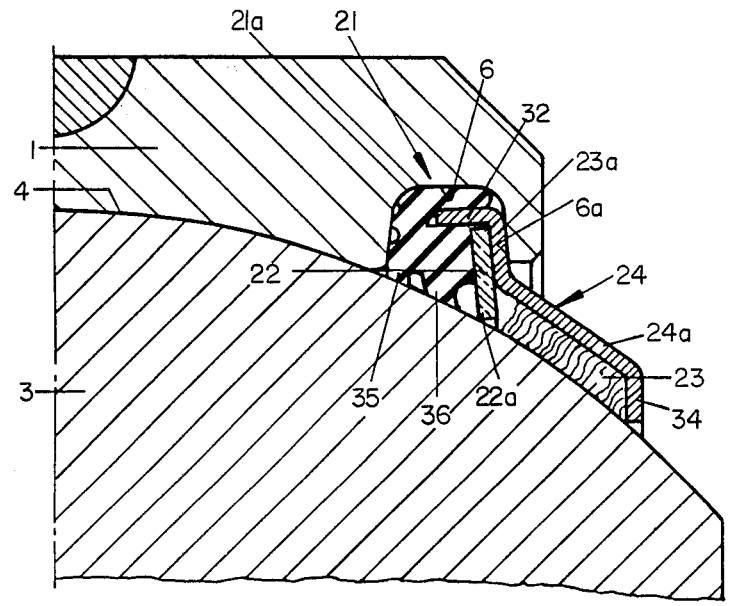
FIG. 3 is a view similar to FIG. 2 showing another embodiment of seal in accordance with the present inventio installed in a ball and socket joint.
Figure 4:
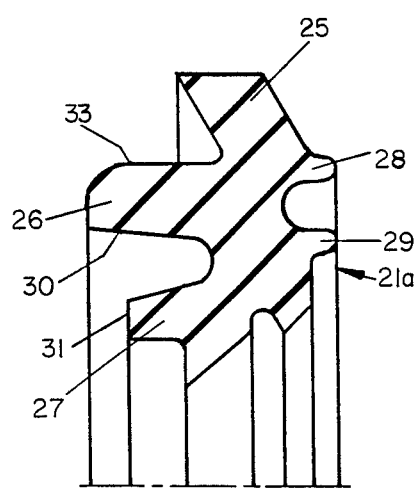
FIG. 4 shows an elastic ring through the seal shown in FIG. 3 in an enlarged scale.

There is illustrated in FIG. 3, another embodiment of seal in accordance with the present invention. The seal is shown in its pre-installed state in FIG. 4. As illustrated, the seal 21 comprises an annular body portion 21a having a series of ribs and projections defining, in the installed seal, a number of sealing points in a manner described below. Thus, the seal includes pairs of axially directed circumferentially extending rings or flange sections 26, 27, 28, 29 projecting generally in an axial direction from the body portion. In the present instance, the ring sections 26 and 27 project to one side and are radially spaced and the ring sections 28 and 29 project axially from the opposite side of the body portion. The seal also includes an outwardly angularly bent circumferential projection 25 as well as two radially inwardly projecting sealing flanges 35 and 36.

The entire seal assembly shown in FIG. 3 is mounted in an annular groove 6 in the outer ring 1 and includes a wiper ring 22 with a slot at one point and an annular retainer member in the form of an angle ring 24 having a layer of flocked fibers 23 and a retaining section 23a.

Considering now the installatio of the seal, first wiper ring 22 is inserted into bore 30 of the outer ring section 26 until it comes to rest against the end surface 31 of the inner ring section 27. Thereafter, angle ring 24 is pushed with its axially oriented edge section 32 onto lateral surface 33 of the outer ring section 26. When the seal is installed in the annular groove 6 of the outer ring, outer flange 25 is deflected inwardly to a point where it rests with radial pretension against the axially oriented edge section of 32 of angle ring 24 and the ring sections 26, 27 28 and 29 are compressed in the axial direction until wiper ring 22 and angle ring are firmly anchored in annular groove 6. Free edge 34 of angle ring 24 extends radially inwardly to a point closely adjacent lateral surface 4 of inner ring 3 to serve as a seal and as a protection for the flocked fiber layer 23. In the fully assembled state, the axially spaced inner sealing lips 35 and 36 rest with radial pretension on lateral surface 4 of the inner ring 3 and seal the separating line between the outer ring 1 and the inner ring 3. Note the sealing lips 35 and 36 have beveled inner surfaces and are of a suitable radial length to conform to the arc of the lateral surface 4 and provide the good sealing effect. Accordingly, in operation as bearing rings 1 and 3 pivot, foreing particulate matter is scraped from lateral surface 4 of the inner ring by wiper ring 22 which may be made of a relatively soft metal. The flocked fiber layer 23 on engaging lateral surface 4 provide an additional sealing effect.

While particular embodiments of the present invention have been illustrated and described herein, it is not intended to limit the invention and changes and modifications may be made therein within the scope of the following claims.

What is claimed is:

1. A seal assembly for sealing between a pair of bearing rings (1, 3) wherein one of the rings has an annular groove (6) for the seal, said assembly comprising an elastic annular ring member consisting of a retaining ring (12) and an O-shaped bead (13) connected to the retaining ring (12) by an elastic web (14), and at least one sealing disk including a wiper ring and an angle ring, the volume of the elastic ring member (7, 21a) being at least the same as that of annular groove (6) in one of the bearing rings (1, 3), said elastic ring member having a retaining section (9, 23) for the parts (8, 11, 22, 24) to be held in place.

2. A seal assembly according to claim 1 wherein said web (14) in the preinstalled state extends essentially in a radially outward direction.

3. A seal assembly according to claim 1 wherein the elastic ring (7, 21a) has one or more sealing (19, 35, 36) lips, which rest against the lateral surface (4) of the inner ring (3).

4. A seal assembly for sealing between a pair of bearing rings (1, 3) wherein one of the rings has an annular groove (6) for the seal, said assembly comprising an elastic annular ring member (7, 21a) consisting of a retaining ring (12) and an O-shaped bead (13) connected to the retaining ring (12) by an elastic web (14), and at least one sealing disk including a wiper ring and an angle ring engageable in an annular groove (15) in the retaining ring (12), the volume of the elastic ring member (7, 21a) being at least the same as that of annular groove (6) in one of the bearing rings (1, 3), said elastic ring member having a retaining section (9, 23) for the parts (8, 11, 22, 24) to be held in place.

5. A seal assembly for sealing between a pair of bearing rings (1, 3) wherein one of the rings has an annular groove (6) for the seal, said assembly comprising an elastic annular ring member (7, 21a) consisting of a retaining ring (12) and an O-shaped bead (13) connected to the retaining ring (12) by an elastic web (14), and at least one sealing disk including a wiper ring and an angle ring engageable in an annular groove (15) in the retaining ring (12), the angle ring (8, 24) consisting of a flange part (9, 23a) and a bent section (17, 24a), and in that the latter is installed a certain distance away from the lateral surface (4) of the inner ring (3), volume of the elastic ring member (7, 21a) being at least the same as that of annular groove (6) in one of the bearing rings (1, 3), said elastic ring member having a retaining section (9, 23) for the parts (8, 11, 22, 24) to be held in place.

6. A seal assembly for sealing between a pair of bearing rings (1, 3) wherein one of the rings has an annular groove (6) for the seal, said assembly comprising an elastic annular ring member (7, 21a) consisting of a retaining ring (12) and an O-shaped bead (13) connected to the retining ring (12) by an elastic web (14), and at least one sealing disk including a wiper ring and an angle ring engageable in an annular groove (15) in the retaining ring (12), the angle ring (8, 24) consisting of a flange part (9, 23a) and a bent section (17, 24a), and in that the latter is installed a certain distance away from the lateral surface (4) of the inner ring, the bent section (17, 24a) has, on the side facing the inner ring (3), a layer of flock fibers (18, 23) the free ends of which rest against the spherical lateral surface (4) of the inner ring (3), the bent section (17, 24a) has, on the side facing the inner ring (3), a layer of flock fibers (18, 23), the free ends of which rest against the spherical lateral surface (4) of the inner ring (3), volume of the elastic ring member (7, 21a) being at least the same as that of annular groove (6) in one of the bearing rings (1, 3), said elastic ring member having a retaining section (9, 23) for the parts (8, 11, 22, 24) to be held in place.

7. A seal assembly for sealing between a pair of bearing rings (1, 3) wherein one of the rings has an annular groove (6) for the seal, said assembly comprising an elastic annular ring member (7, 21a) consisting of a retaining ring (12) and an O-shaped bead (13) connected to the retaining ring (12) by an elastic web (14), and at least one sealing disk including a wiper ring and an angle ring engageable in an annular groove (15) in the retaining ring (12) on the side facing the end surfaces of the bearing ring (1), the wiper ring (1, 22) being made out of a material hard relative to the ring member and having an edge (16, 22a) in the bore, the volume of the elastic ring member (7, 21a) being at least the same as that of annular groove (6) in one of the bearing rings (1, 3), said elastic ring member having a retaining section (9, 23) for the parts (8, 11, 22, 24) to be held in place.

* * * * *